United States Patent [19]

Horsman et al.

[11] 4,405,147
[45] Sep. 20, 1983

[54] TRAILER STEERING DEVICE FOR SPACED AXLE TRAILER

[75] Inventors: John Horsman, Scottsdale; James W. Ryden, Phoenix, both of Ariz.

[73] Assignee: U-Haul Technical Center, Phoenix, Ariz.

[21] Appl. No.: 275,504

[22] Filed: Jun. 19, 1981

[51] Int. Cl.³ .............................................. B60D 1/00
[52] U.S. Cl. ................................... 280/443; 280/442; 280/460 R; 280/DIG. 14
[58] Field of Search ............... 280/443, 442, 444, 426, 280/DIG. 9, DIG. 14, 460 R

[56] References Cited

U.S. PATENT DOCUMENTS

| | | | |
|---|---|---|---|
| 1,422,040 | 7/1922 | DeLaunty | 280/443 |
| 2,092,683 | 9/1937 | Stidham | 280/443 |
| 2,338,934 | 1/1944 | Gross | 280/443 |
| 2,498,779 | 2/1950 | Winchester | 280/442 |
| 3,613,921 | 10/1971 | Ryden | 280/443 |
| 3,753,580 | 8/1973 | Folkert | 280/443 |
| 3,876,240 | 4/1975 | Watson | 280/443 |
| 4,171,825 | 10/1979 | Woodell | 280/443 |
| 4,191,394 | 3/1980 | Kasselmann | 280/444 |

Primary Examiner—Joseph F. Peters, Jr.
Assistant Examiner—Donn McGiehan
Attorney, Agent, or Firm—Cahill, Sutton & Thomas

[57] ABSTRACT

A steering device for steering a spaced axle trailer includes a pair of pivots connecting a tongue to a frame of the trailer. The steering device includes a primary arm pivotally connected to the trailer frame. The primary arm is coupled to pivotal spindle mechanisms on which the front trailer wheels are mounted to translate pivotal movement of the primary arm to the spindles, causing steering of the trailer. A mechanical surge brake device is connected to the tongue. A laterally movable element of the surge brake mechanism is attached to a hitch socket that fits over a hitch ball attached to a tow vehicle, so that the distance between the tow vehicle and the trailer is decreased slightly when the brakes of the tow vehicle are applied. First and second tensile control elements are connected between first and second spaced points of the primary arm and first and second spaced control connecting points of the tow vehicle to apply tensile forces to the primary steering arm, causing it to pivot in response to changing of direction of the tow vehicle relative to the trailer.

14 Claims, 13 Drawing Figures

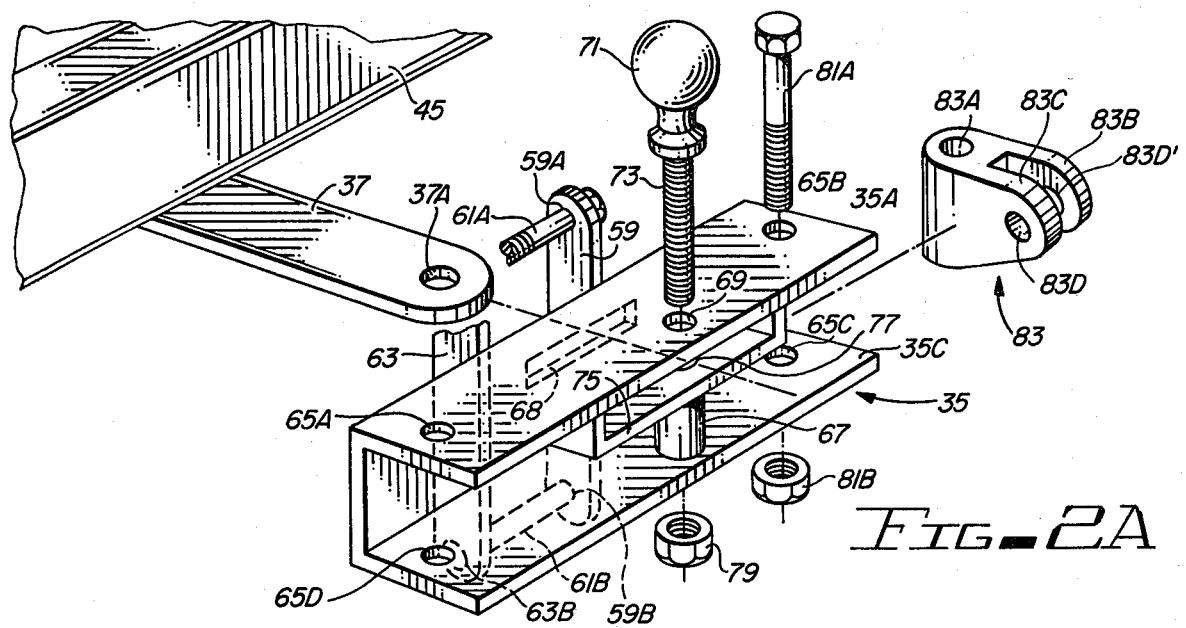
FIG-2A
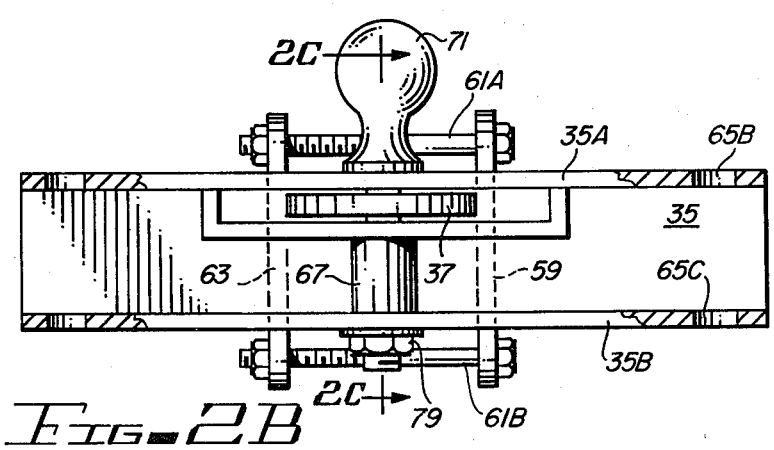
FIG-2B
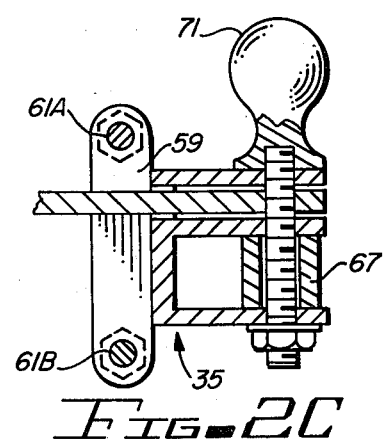
FIG-2C
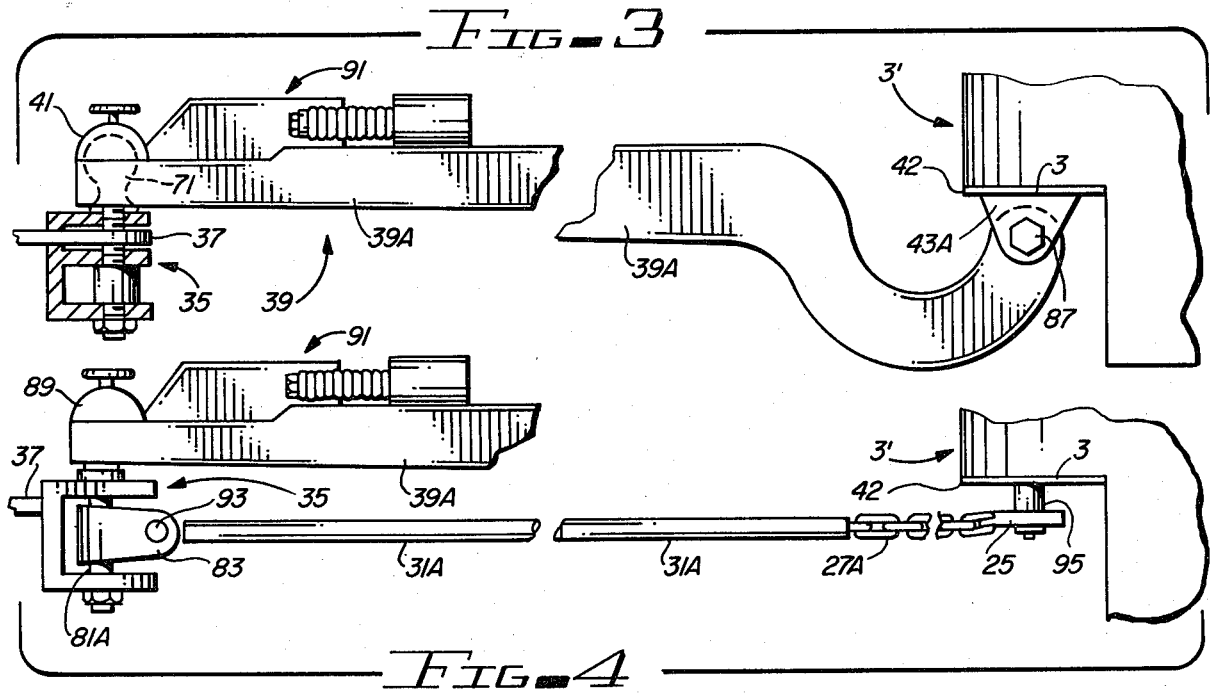
FIG-3
FIG-4

TRAILER STEERING DEVICE FOR SPACED AXLE TRAILER

BACKGROUND OF THE INVENTION

1. Field of the Invention

The invention relates to trailers, and more particularly, to automatic steering mechanisms for trailers.

2. Description of the Prior Art

A wide variety of trailers are commonly used in the trailer rental industry. In the past, many automobile owners have had relatively large, powerful automobiles which they occasionally used for towing rental trailers. Since the weight of such rental trailers, when loaded, has often been substantially less than the weight of the tow vehicle, the brakes of the tow vehicle have been adequate to stop both the tow vehicle and the loaded trailer, thereby obviating the need for providing trailer brakes. When it has been necessary to provide brakes on a trailer, a type of brake device known as a mechanical surge brake device has been used. Mechanical surge brake devices are connected in series relationship with the tongue of the trailer and the hitch ball of the towing vehicle. When the brakes of the towing vehicle are applied, inertia of the loaded trailer in a forward direction causes compression of the mechanical surge brake device, shortening the effective length of the tongue by approximately one to two inches, depending on the state of adjustment of the trailer brakes. The compression of the mechanical surge brake device actuates the hydraulic brake system of the trailer, applying the brake as long as the forward force continues to be applied by the inertia or weight of the trailer against the hitch ball of the towing vehicle. Various mechanical surge brakes devices often include brake drum mechanisms which deactuate the wheel brakes when the towing vehicle backs up and pushes the towed trailer in the reverse direction, thereby allowing the trailer to be "backed up" without causing its brakes to remain actuated due to the compressive force applied to the mechanical surge brake device by the trailer hitch.

It is well known that there is trailer-to-car oscillation that occurs when a car tows a trailer. This type of oscillation must be controlled and adequately "damped" in order to prevent dangerous and undesirable instability of the trailer and tow vehicle, especially at high speeds. In the past, a very important technique for reducing the amplitude of such oscillations simply has been to increase the "tongue weight", i.e., the downward force exerted by the tongue of the trailer on the tow vehicle. This approach has been relatively satisfactory in reducing the amplitude of trailer-to-car oscillations to non-dangerous levels only because the average automobile used for towing trailers has been quite heavy compared to the weight of the loaded trailer. However, in recent years there has been a trend to reducing the size and weight of most automobiles. Many compact or subcompact automobiles are small, relatively light, and have front wheel drive. These factors greatly reduce the amount of tongue weight that can be safely applied to trailer hitches installed on such cars. Thus, reducing of the above mentioned dangerous instability caused by car-to-trailer oscillations by merely increasing the tongue weight is no longer always satisfactory, because of the inability of today's smaller automobiles to support great tongue weights. It therefore has become necessary to find alternate ways of improving the stability of trailers having with relatively low tongue weights, especially for trailers designed for rental to consumers.

Accordingly, it is an object of the invention to provide a highly stable trailer which has a relatively low tongue weight on the towing vehicle.

In order to provide a suitable degree of stability and safety for a relatively large, heavy trailer, and in order to also accomplish the objective of low tongue weight, it has been found to be expedient to use so-called "spread axle" trailers, wherein separate axles are provided close to the front and rear portions, respectively, of the trailer. This leads to the requirement that the front wheels of the spread axle trailer be steerable as the trailer is towed or backed up around sharp curves by the tow vehicle. Numerous devices have been proposed for accomplishing steerable front wheels on four wheel trailers. Many such devices have had the serious shortcoming that the control mechanism for pivoting the front wheels of the trailer to accomplish steering accomplished such pivoting in response to lateral swiveling of the trailer tongue relative to the trailer frame. Such systems result in trailers that are very difficult for amateurs to control while backing up because "jack-knifing" usually occurs as a result of slight steering errors by the driver. It is essential that trailers rented to the general public be capable of being easily backed up without jack-knifing.

It is another object of the invention to provide a safe, highly stable spread axle trailer that is easily backed up by an average automobile driver and does not cause jack-knifing as a result of minor steering errors.

Due to the recent prevalence of small automobiles, it is becoming increasingly necessary to provide automatic braking systems on rental trailers. Electrical connectors which are frequently disconnected and re-connected, as is necessary in the trailer rental business, are inherently unreliable and also are subject to frequently being damaged by the renters. This causes use of electrical surge braking systems to be unsatisfactory for use on rental trailers. Consequently, only mechanical surge braking devices are satisfactory for rental trailers. However, use of present mechanical surge brake systems results in a substantial shortening of the effective tongue length when the trailer brakes are actuated by a mechanical surge brake device as a result of applying the brakes of the towing vehicle when it is moving forward. It is necessary that an automatic steering system for a spread axle trailer be not undesirably influenced by the above mentioned shortening of the effective tongue length as a result of activation of a mechanical surge brake device.

Accordingly, another objective of the invention is to provide a highly stable spread axle trailer having a steering system which is not unduly sensitive to changes in the effective tongue length of the trailer occuring when the brakes of a tow vehicle are applied.

A number of trailer steering devices have been proposed which either avoid (or could be adapted to avoid) the above mentioned tendency to "jack-knife" as a result of minor steering errors made by the tow vehicle driver while "backing up". However, most of the known steering devices utilize rigid connections between the tow vehicle and the trailer. This results in potentially dangerous changes in the "self-steering" trailer when the brakes of the tow vehicle are applied, or else results in a great loss of accuracy in self-steering control when the towed vehicle is backed up if a mechanical surge brake mechanism is used.

For example, U.S. Pat. No. 1,422,040 discloses a trailer steering device in which the tongue pivots only in the vertical direction, and therefore, remains aligned with the trailer. However, an impractical scissor-like steering mechanism is used to accomplish pivoting of both the front and rear wheels to accomplish steering of the trailer as the two vehicle traverses a turn. An energy absorbing spring incorporated in the hitch mechanism allows the trailer to move forward slightly, relative to the tow vehicle, when the brakes of the tow vehicle are applied. The scissor-like mechanism then opens slightly, greatly reducing the sensitivity of the steering mechanism during backing up of the trailer. This causes undesirable mis-steering by the mechanism and undesirable sideways "scrubbing" of the trailer wheels and tow vehicle wheels on the road as sharp turns are negotiated. U.S. Pat. Nos. 4,191,394, 4,171,825, and 3,876,240 all disclose steering devices which rely on an auxiliary hitch point attached to the tow vehicle for detecting changes in direction of the tow vehicle, relative to the trailer, and causing corresponding pivotal self-steering of the front wheels of the trailer. All of the disclosed systems would result in dangerous and abrupt changes in the direction of self-steering and consequent lateral lurching and applying of lateral forces on the light rear end of the tow vehicle when the brakes of the tow vehicle are suddenly applied. This is especially true at high speeds, thereby creating potentially very dangerous situations. U.S. Pat. No. 2,498,779 discloses a self-guiding trailer dolly which, if modified to incorporate a mechanical surge brake system, would provide forward steering control that would be relatively insensitive to changes in the effective tongue length resulting when brakes of the tow vehicle are applied. However, that system is inherently very unstable due to the fact that the entire front axle is pivotally connected at its center point to the frame of the trailer and pivots at the center point to accomplish steering; this structure prevents the front wheels and axle support system from effectively limiting sideways oscillation of the trailer. U.S. Pat. No. 3,753,580 discloses a steering system designed to cause a two wheel trailer to track properly. In one disclosed embodiment, a telescoping linkage from the tow vehicle to the steering mechanism is provided. However, the telescoping arrangement greatly decreases the degree of control over steering of the trailer that can be accomplished, because while the trailer is being towed, there will be no steering control for a substantial amount of "turning" (of the trailer and tow vehicle around a curve) in one direction, and while backing up, there will be no steering control of a substantial amount of "turning" in the other direction.

Accordingly, it is another object of the invention to provide a highly stable, steerable four wheel spread axle trailer which overcomes the shortcomings of the known prior art.

SUMMARY OF THE INVENTION

Briefly described, and in accordance with one embodiment thereof, the invention provides a spread axle trailer including front and rear axles on which front and rear wheels are respectively mounted. The front wheels are pivotally connected to the front axle by means of spindles to effect steering of the trailer. A tongue is pivotally connected to a frame of the trailer to confine pivotal movement of the tongue to substantially vertical directions. In the described embodiment of the invention, a mechanical surge brake device is connected in series relation with the tongue and a hitch ball attached to a tow vehicle. The effective length of the tongue is shortened when the brakes of a forward moving tow vehicle are applied in order to activate the brakes of the trailer to slow it. A removable draw bar, connected to an elongated hitch bar by means of a hitch ball bolt and a pair of side clamp elements, includes two connecting points spaced on either side of the hitch ball. A steering mechanism connected to the trailer and also to the two connecting pivots of the draw bar includes a primary steering arm pivotally connected to the frame of the trailer. A coupling mechanism connects the primary steering arm to the spindles on which the front wheels are mounted to translate pivotal movement of the primary steering arm to the spindles and front wheels. In one embodiment of the invention, the coupling mechanism includes two tie rods connecting two respective spaced pivot points of the primary steering arm to two lever arms connected to the two respective spindles. In another embodiment of the invention, a secondary steering arm is pivotally connected to the trailer frame and is coupled by a rigid connecting rod to the primary pivot arm, and the two tie rods are pivotally connected to two spaced pivot points of the secondary steering arm, instead of to the primary steering arm. In both described embodiments of the invention, first and second tensile control elements connect first and second spaced points of the primary steering arm to the respective connecting points of the draw bar to pull the first or second point of the primary steering arm toward the tow vehicle, rotating the primary steering arm in one direction in response in steering of the tow vehicles to the right, relative to the direction of the trailer, or rotating the primary steering arm in the opposite direction in response to steering of the tow vehicle to the left. The first and second tensile control elements yield in a balanced fashion in compression to avoid substantial turning of the primary steering arm as a result of the effective shortening of the tongue length that occurrs when the surge brake mechanism is actuated if the tow vehicle is moving forward. A predetermined amount of slack is provided in each of the first and second connecting elements. The predetermined amount of slack is selected both to avoid such tension in the first and second connecting elements as might accidentally actuate the trailer brakes when the tow vehicle is upwardly inclined on a slope that is steep relative to the slope on which the trailer rests, and also to achieve a minimum amount of sideways scrubbing of the front wheels on the road surface when driving the tow vehicle and trailer through sharp right and left turns in either the forward or reverse directions.

BRIEF DESCRIPTION OF THE DRAWINGS

FIG. 2A is an exploded perspective view of a draw bar device for connection to a tow vehicle.

FIG. 2B is a partial cut away rear view of the draw bar hitch assembly of FIG. 2A.

FIG. 2C is a sectional view taken along section line 2C—2C of FIG. 2B.

FIG. 3 is a partial side view of the tongue and the hitch mechanism of FIG. 1A.

FIG. 4 is a side view showing part of the tongue, the trailer hitch, and one of the control arms of the embodiment of the invention shown in FIG. 1A.

DESCRIPTION OF THE INVENTION

Figure 1A:
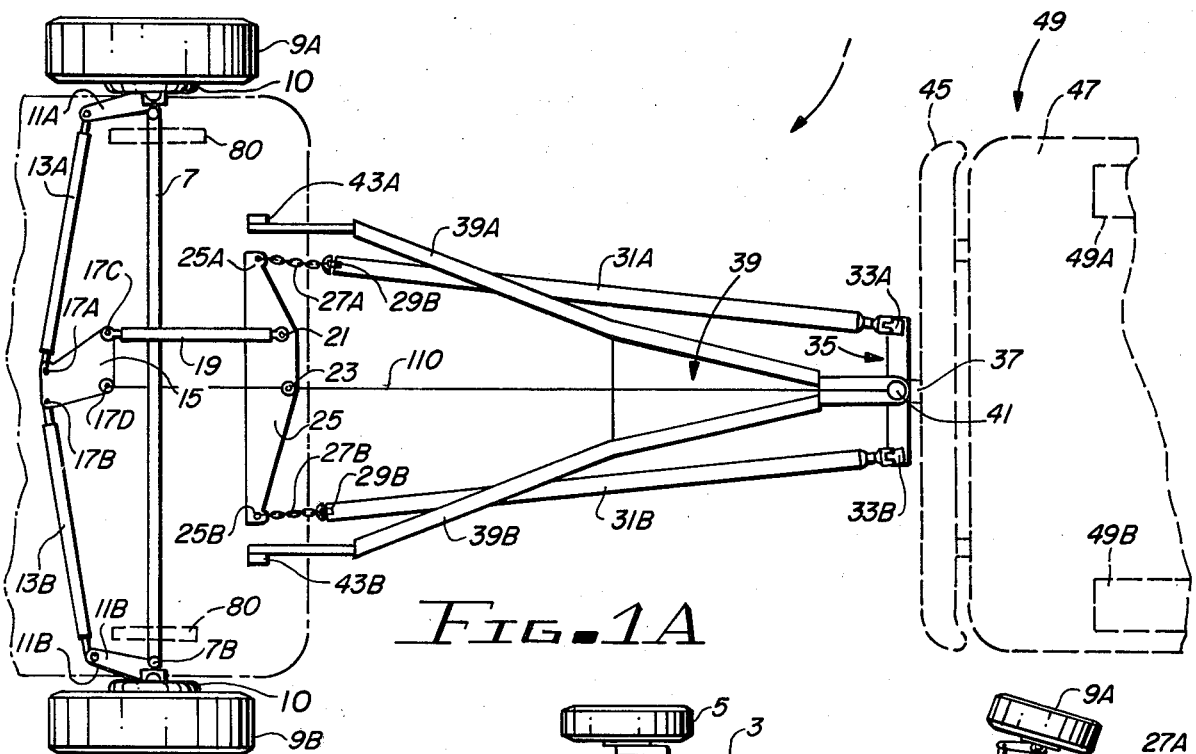
FIG. 1A is a partial schematic diagram of a trailer including the trailer steering mechanism of the invention connected to a tow vehicle.
Figure 1C:
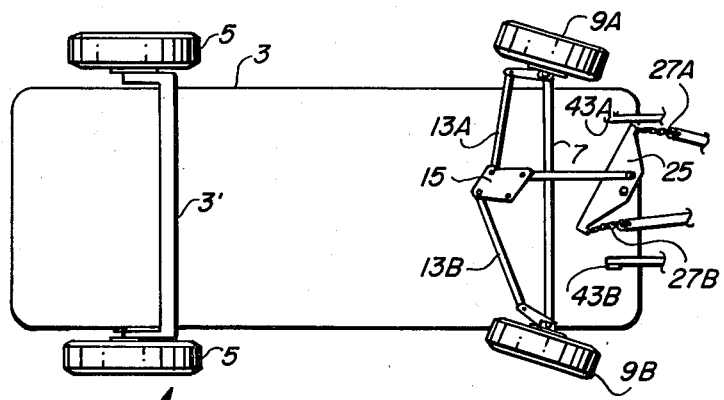
FIG. 1C is a schematic top view illustrating a spread axle trailer in which the steering device of FIG. 1A is incorporated.
Figure 1B:
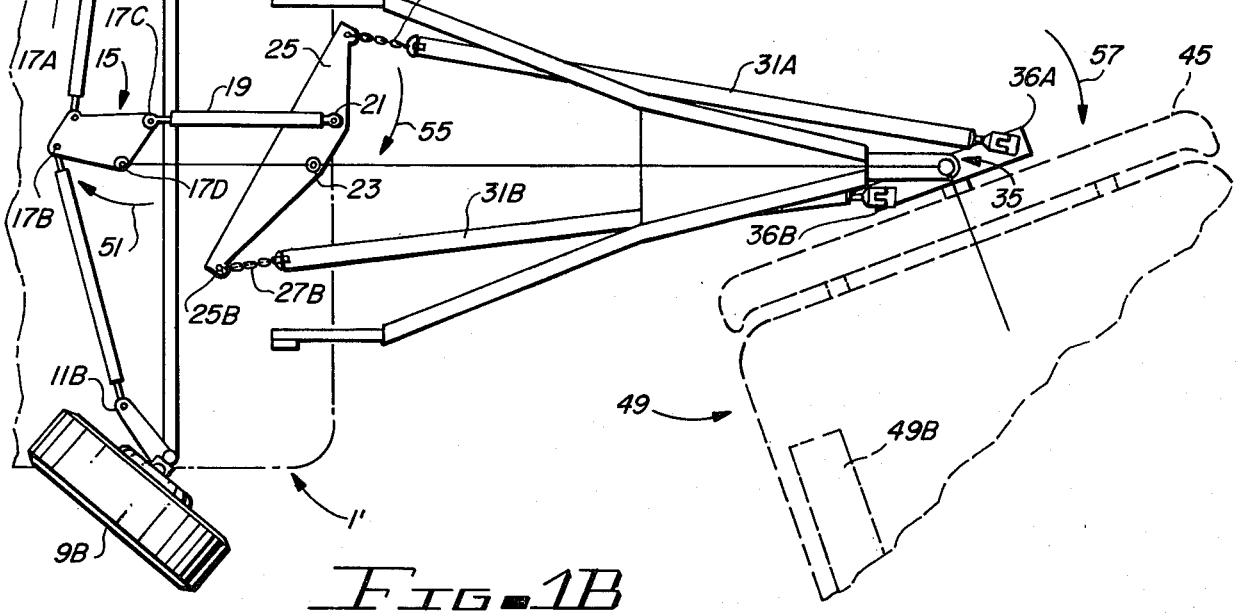
FIG. 1B is a top view schematic diagram of the device in FIG. 1A for the condition that the tow vehicle is traversing a sharp turn.

Referring now to the drawings, particularly FIGS. 1A-1C, a steering mechanism 1 is shown for a four-wheel "spread axle" type of trailer 1' (FIG. 1C). Trailer 1' has a frame 3, the rear portion of which is supported by rear axle 7' and the front portion of which is supported by front axle 7. Two rear wheels 5 are rotatably disposed on the ends of rear axle 7', and front wheels 9A and 9B are rotatably and pivotally connected to the opposed ends of front axle 7. Wheel brake mechanisms such as 10 in FIG. 1A are attached to the end of each axle to provide braking for each wheel of the trailer.

A tow vehicle 49 having a body 47 and a rear bumper 45 has a hitch ball support arm 37 rigidly attached to body 47. Tow vehicle 49, only the rear portion of which is shown, has rear wheels 49A and 49B. A hitch ball 71 (shown in detail in FIG. 2A) is rigidly attached to hitch ball support arm 37.

Referring particularly to FIGS. 1A, 3, and 4, a tongue generally designated by reference numeral 39, is pivotally connected to the front portion of trailer frame 3 by means of two hinge elements 43A and 43B rigidly attached to the underside of frame 3. Tongue 39 includes two rigid arms 39A and 39B, the rear end portions of which are pivotally attached to hinge elements 43A and 43B. As best seen in FIG. 3, tongue arm 39A has a hook-shaped, curved rear end portion 39A' connected by means of bolt or pin 87 to hinge element 43A. The reason for providing the hook shape for end portion 39A' is to allow the front end (i.e., the left end in FIGS. 3&4) of tongue 39 to be raised sharply without causing the upper surface of rigid arms 39A and 39B to strike corner 42 of the leading edge of frame 3 or of trailer body 3', which is supported on frame 3. Tongue 39 may be sharply inclined relative to frame 3 if the road surface over which tow vehicle 49 and trailer 1' move includes an abrupt downwardly sloped portion, such as the surface of a gutter, followed by a steeply upwardly inclined portion, such as a driveway adjacent to the gutter. As subsequently explained, the steering mechanism 1 must be capable of avoiding locking the brakes of trailer 1' when such a ground contour is traversed by the tow vehicle 49 and trailer 1'. A mechanical surge brake mechanism 91 is disposed on the forward end portion of tongue 39. A conventional trailer hitch socket 89 is connected to the foremost portion of mechanical surge brake mechanism 91, as illustrated in detail in FIG. 5. Hitch ball 71 engages the inside of trailer hitch socket 89, as indicated in FIG. 3, allowing tow vehicle 49 to be reliably, pivotally coupled to tow trailer 1'.

Figure 5:
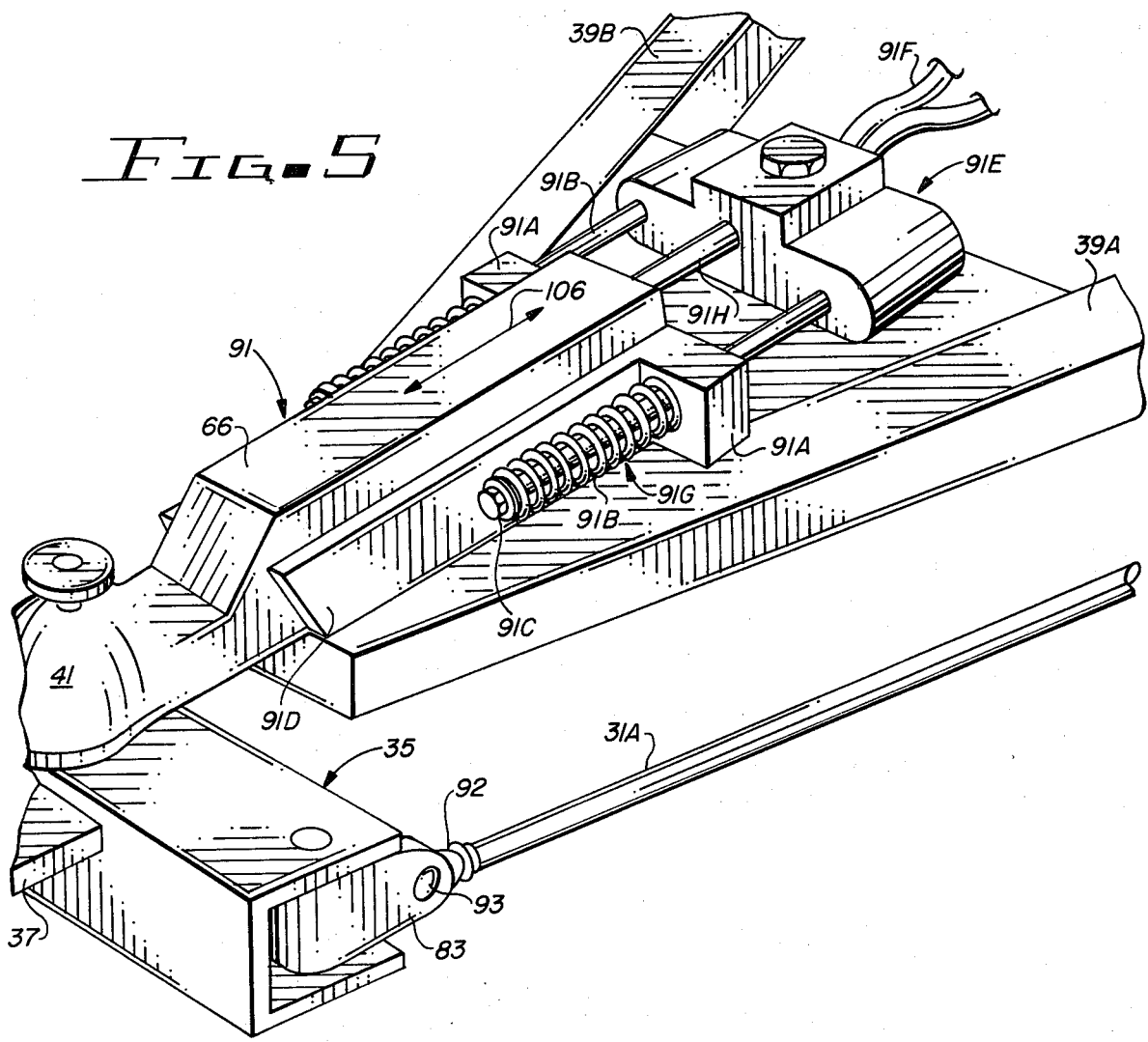
FIG. 5 is a partial perspective view illustrating a draw bar hitch, a portion of the trailer tongue, and a mechanical surge brake mechanism utilized in the embodiment of the invention shown in FIG. 1A.

Referring now to FIG. 5, surge brake mechanism 91 includes a movable member 66 to which trailer hitch socket 41 is connected. Movement of member 66 is confined to the forward/rearward directions indicated. An actuating rod 91H is connected to the rear end of movable member 66 and engages a plunger mechanism in hydraulic brake cylinder mechanism 91E. Hydraulic brake fluid lines 91F are connected between master brake cylinder 91E and the respective wheel brake cylinders of the four wheels of trailer 1'. Fixed blocks 91A are rigidly attached to tongue 39. Two rods 91B are rigidly attached to the housing of master brake cylinder mechanism 91E, and extend in sliding relationship through two holes extending through the two fixed blocks 91A and through a pair of coil springs 91G, respectively. A bolt and retaining washer, indicated by reference numeral 91C, is attached to the forward end of each of rods 91B, retaining springs 91G between washers 91C and fixed blocks 91A. Fixed guide members 91D are disposed on either side of movable member 66 to provide a channel in which movable member 66 slides in the fashion described above.

Figure 6A:
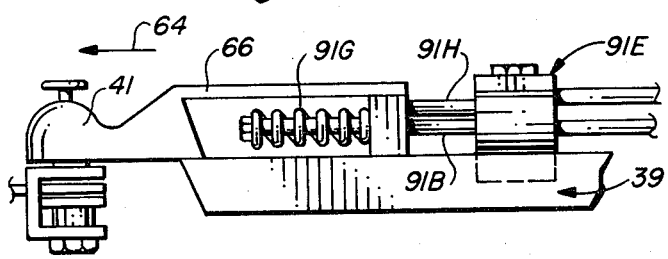
FIGS. 6A and 6B each are partial side views of the surge brake mechanism shown in FIG. 5 and are useful in explaining the operation thereof.
Figure 6B:
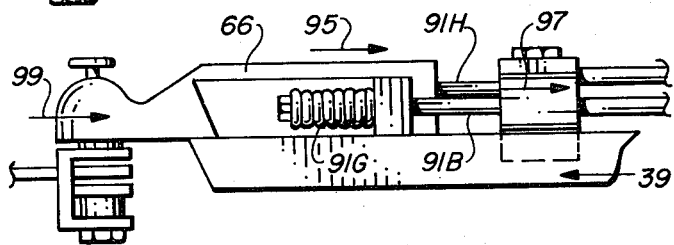

The operation of mechanical surge brake mechanism 91 is best understood with reference to FIGS. 6A–6C, and is necessary to understanding the operation of the steering system of FIG. 1A.

FIG. 6A discloses the relationship between movable member 66 and tongue 39 when the trailer hitch ball 41 pulls trailer 1' forward, in the direction indicated by arrow 64. Spring 91G is not substantially compressed under the conditions of FIG. 6A so the "effective length" of tongue 39, i.e., the distance from the most forward point of trailer hitch socket 41 to frame 3 of trailer 1', has its maximum value.

If the driver of tow vehicle 49 actuates its brakes, trailer hitch ball 71 exerts a force in the direction of arrow 99 (in FIG. 6B) on movable member 66, causing it to move (relative to tongue 91) in the direction indicated by arrow 95. Thrust rod 91H pushes the housing of master brake cylinder 91E rearward, causing rods 91B to move in the direction indicated by arrow 97 in FIG. 6B. This pulls retaining washers 91C of each of rods 91B rearward, partially compressing springs 91G, as indicated in FIG. 6B. The counterforce produced on brake cylinder 91E actuates master brake cylinder 91E, turning on the brakes of trailer 1'.

Returning now to FIG. 1A, steering mechanism 1 includes two "tension arms" or control arms 31A and 31B. The forward end of each of tension arms 31A and 31B is connected to a respective connecting element such as 83, shown in FIGS. 2A and 5. Each of the connecting elements 83 includes a vertical opening 83A through which a bolt 81A extends in order to pivotally connect the coupling element 83 to a draw bar 35 that is rigidly attached to tow vehicle 49. (Draw bar 35 is rigidly connected to hitch ball support member 37 is subsequently explained). Coupling element 83 includes two ears 83B and 83C having horizontal holes 83D and 83D', respectively, therein.

A pin 93 (FIG. 5) passing through the forward end of a connecting element attached to the forward end of control rod 31A connects the forward end of control rod 31A to universal coupling element 83. Thus, it is seen that there is a universal joint coupling between forward end of each of control rods 31A and 31B and the respective outer end portions of draw bar 35.

Referring now to FIG. 4, it is seen that the front portion of each of control arms 31A and 31B is disposed lower (by approximately two and three-fourth inches) than tongue arms 39A and 39B and the center of pivot ball 71. The rear end portions of control arms 31A and 31B are connected by means of chains 29A and 29B, respectively, to the end portions 25A and 25B of primary steering arm 25, as shown in FIG. 1A.

Referring particularly to FIGS. 1A and 4, point 23 (FIG. 1A) of primary steering arm 25 is pivotally connected to pedestal 95 (FIG. 4) which is rigidly attached to the underside of frame 3, as indicated in FIG. 4. The elevation of primary pivot arm 25 is the same as the elevation of the rear pivot axis (i.e., bolt 8) of tongue 39 (FIG. 3).

It should now be noted that the lateral distance traveled by moving element 66 in FIG. 6B relative to tongue 39 when the brakes of the forward moving tow vehicle 49 are applied is typically one to two inches, depending upon the adjustment of the brake drums of the various wheels of trailer 1'. Various mechanical surge brake mechanisms are known in the art and are readily available, so that the precise operation thereof need not be described in any more detail than is necessary to understand the operation of the invention. The important point is that the effective tongue length of tongue 39 is reduced from its maximum length (when trailer 1' is being pulled) to a lessor length approximately one to two inches shorter than the maximum length (when the brakes of moving tow vehicle are being applied hard enough to stop it and trailer 1'). Therefore, it is necessary that the steering mechanism 1 be not unduly sensitive to the variable effective length of tongue 39.

Referring again to FIG. 1A, a pivot point 21 on primary steering arm 25 is connected by means of a connecting rod 19 to a pivot point 17C on a secondary steering arm 15. Secondary steering arm 15 is pivotally connected at pivot point 17D to frame 3.

Spindles 7A and 7B are pivotally connected to the opposed ends of axle 7 in an entirely conventional manner to provide a satisfactory amount of caster for front wheels 9A and 9B. Preferably, the amount of caster is selected to cause front wheels 9A and 9B to have a tendency to self-steer when trailer 1' is being towed forward, and yet do not have too great a tendency to try to pivot one hundred eighty degrees about the spindle king pins when trailer 1' is backed up. A typical amount of caster would be two to seven degrees. Arms 11A and 11B are rigidly connected to spindles 7A and 7B, respectively. The free ends of arms 11A and 11B are connected by means of tie rods 13A and 13B, respectively, to pivot points 17A and 17B of secondary steering arm 15.

Note that an actual side view of the trailer 1' will include both control arm 31A and tongue 39 in FIG. 3, but for purposes of illustration, the rear portion of tongue 39 has been deleted in order to allow chain 27A, post 95 and primary steering arm 25 to be clearly seen. In the described embodiment of the invention, the elevation of the pivot axis on tongue 39 is the same distance from the roadway as the plane of primary steering arm 25. The elevation of the axis of pin 93 through coupler 83 at the forward end of control arm 31A is approximately 2¾ inches lower than the center of pivot ball 71.

A small amount of slack is provided in chains 27A and 27B when tongue 39 has its maximum effective length and both the tow vehicle 49 and trailer 1' are on flat ground, so that no portion of chains 27A and 27B will "bend around" edge 42 of trailer body 3' if the tow vehicle begins to ascend a sharp incline relative to the ground on which trailer 1 is supported. This obviously could cause undesired actuation of the trailer brakes and undue stresses on various pivot points of steering mechanism 1.

In the embodiment of FIG. 1A, the distance between the centers of holes 69 and 65B (FIG. 2A) on draw bar 35 is six and one half inches. Hole 65A is the same distance on the opposite side of hole 69. The length of tongue 39 is approximately sixty-seven and one half inches when tow vehicle 49 is exerting a forward force on tongue 39, although this dimension is not critical.

The distance between the centers of pivot point 23 of primary steering arm 25 and pivot point 25A is 15 inches. The line between pivot points 23 and 25A is inclined rearward twelve and one half degrees with respect to axle 7. The perpendicular distance between longitudinal axis 110 (which passes through the center points of pivot point 23, pivot ball 41 and pivot point 170 is six inches, and connecting rod 19 is parallel to axis 110. The distance between pivot point 170 and each of pivot points 17A and 17B is seven and one half inches. Tie rod 13A is inclined forward 15 degrees relative to the axis of axle 7, as viewed in FIG. 1A. The distance between the center axes of the king pins of pivots 7A and 7B and the pivot points at the free end portions of arms 11A and 11B is eight inches.

The pivot points of pivot elements 43A and 43B are located four inches behind the front edge of frame and body 3.

The operation of the steering mechanism 1 of FIG. 1A is best explained with further reference to FIG. 1B. Referring to FIG. 1B, it is seen that if tow vehicle 49 turns in the direction indicated by arrow 57 relative to trailer 1', end 36A of draw bar 35 moves forward relative to frame 3. This causes the chain 27A to be placed in tension, and causes end 25A of primary steering arm 25 to be pulled forward, causing primary steering arm 25 to rotate about pivot point 17C of secondary steering arm 15 forward in the direction of arrow 55. This causes steering arm 15 to pivot about pivot point 7D, causing secondary steering arm 15 to rotate in the direction indicated by arrow 51. Pivot points 17A and 17B of secondary steering arm 15 therefore move in the direction indicated by arrow 18, causing spindles 7A and 7B (and wheels 9A and 9B mounted thereon) to pivot about the spindle king pins in the direction indicated by arrow 53.

It is important to note that during the foregoing operation, only chain 27A is under substantial tension. Chain 27B is relatively slack, there being only enough tension in chain 27B to support the weight of steering arm 31B and chain 27B itself.

If tow vehicle 49 turns in the direction opposite to that indicated by arrow 57, the operation is identical to that described above, except that in this event, control arm 31B and chain 27B are in tension and chain 27A and control arm 31A are slack. The direction of rotation of primary steering arm 45, secondary steering arm 15 and front wheels 9A and 9B are opposite to the directions indicated by arrows 55, 51, and 53, respectively.

It is important to note that the foregoing operation is essentially identical regardless of whether tow vehicle 49 is moving forward or backing up. The only difference is that if tow vehicle 49 is backing up, the effective length of tongue 39 will be shortened by an amount of one to two inches, due to the previously explained operation of surge brake mechanism 91. Recall that the brake drum mechanisms commonly used in conjunction with mechanical surge brake devices prevent the trailer brake drums from being fully actuated if the trailer wheels rotate backwards. This prevents the trailer brakes from being actuated when tow vehicle 49 backs up. However, the above mentioned one to two inch shortening of the effective length of trailer tongue 39 nevertheless occurs. The one to two inch shortening of the effective length of tongue 39 during a backing up operation is compensated for by the flexibility of chains 29A and 29B. (It should be noted that if there were no such flexing, the entire force pushing trailer 1' backward would be applied to primary steering arm 25 annd its pivot point 23. This obviously would be unsatisfactory. Since the effective tongue length is shortened during the backing up operation, there is an increased amount of slack in claims 27A and 27B. This reduces the preciseness of steering control that steering mechanism 1 is capable of, to some extent, but the degree of control nevertheless has been found to be more than adequate to ensure that only a minimal amount of lateral scrubbing of front tires 9A and 9B occurs. The level of steering control achievable makes steering during the backing up operation as effortless for spread axle trailer 1' as it would be if trailer 1' were only a single axle trailer.

The embodiment of the invention shown in FIGS. 1A and 1B is particularly suitable if axle 7 is suspended by conventional leaf springs 80, because in this case, axle 7 will be located below connecting rod 19. Axle 7 then moves up and down as trailer 1' traverses bumps in the road, so sufficient clearance must be allowed for the maximum possible vertical displacement of axle 7. This prevents connecting of straight tie rods 13A and 13B directly to suitable pivot points on primary steering arm 25, thereby making expedient the provision of secondary steering arm 15 and connecting rod 19.

Figure 7A:
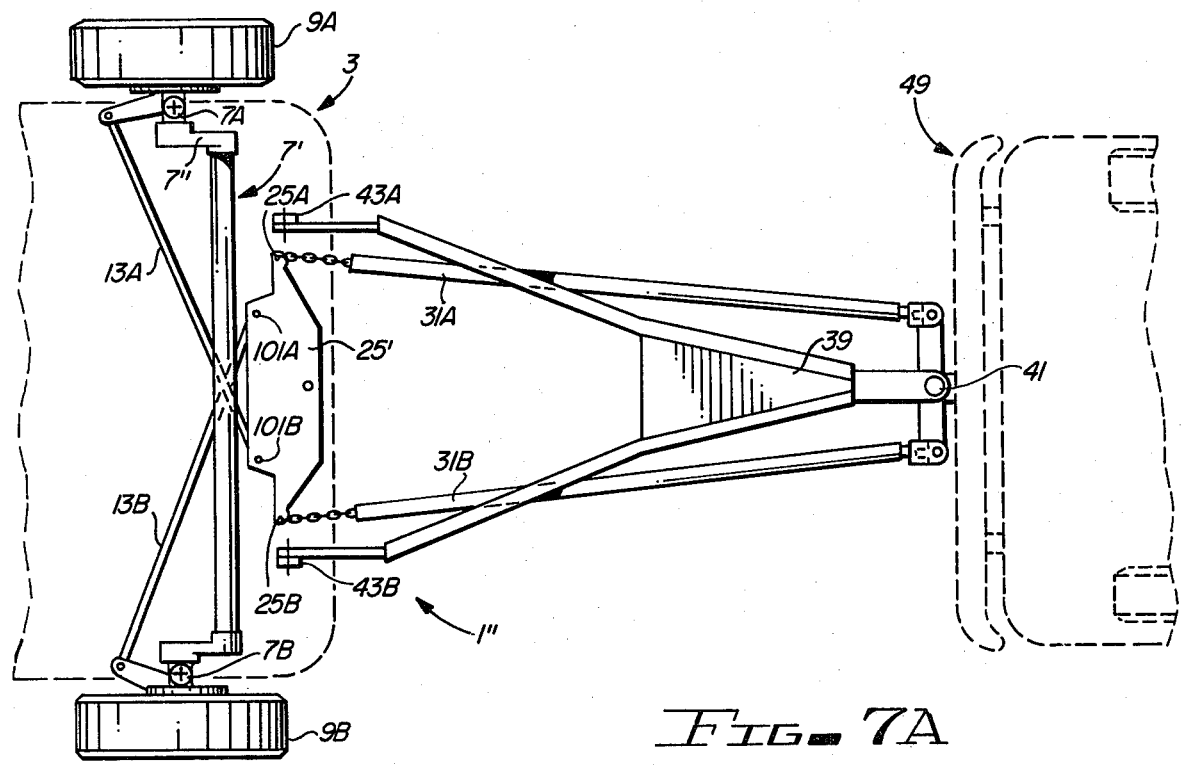
FIG. 7A is a partial schematic top view of an alternative embodiment of the invention.

However, if free axle 7 of FIG. 1A is replaced by a torsion bar axle arrangment 7' as indicated in FIG. 7A, the torsion bar axle normally would be attached directly to frame 3. Torsion arms such as 7'' are sloped downward toward the road surface from the ends of the axle 7'. Tie rods 13A and 13B extend beneath torsion bar axle 7', and can be connected directly to pivot points 101A and 101B of modified primary steering arm 25', as shown in FIG. 7A. In this case, there is no need for providing secondary steering arm 15 or connecting rod 19.

Figure 7B:
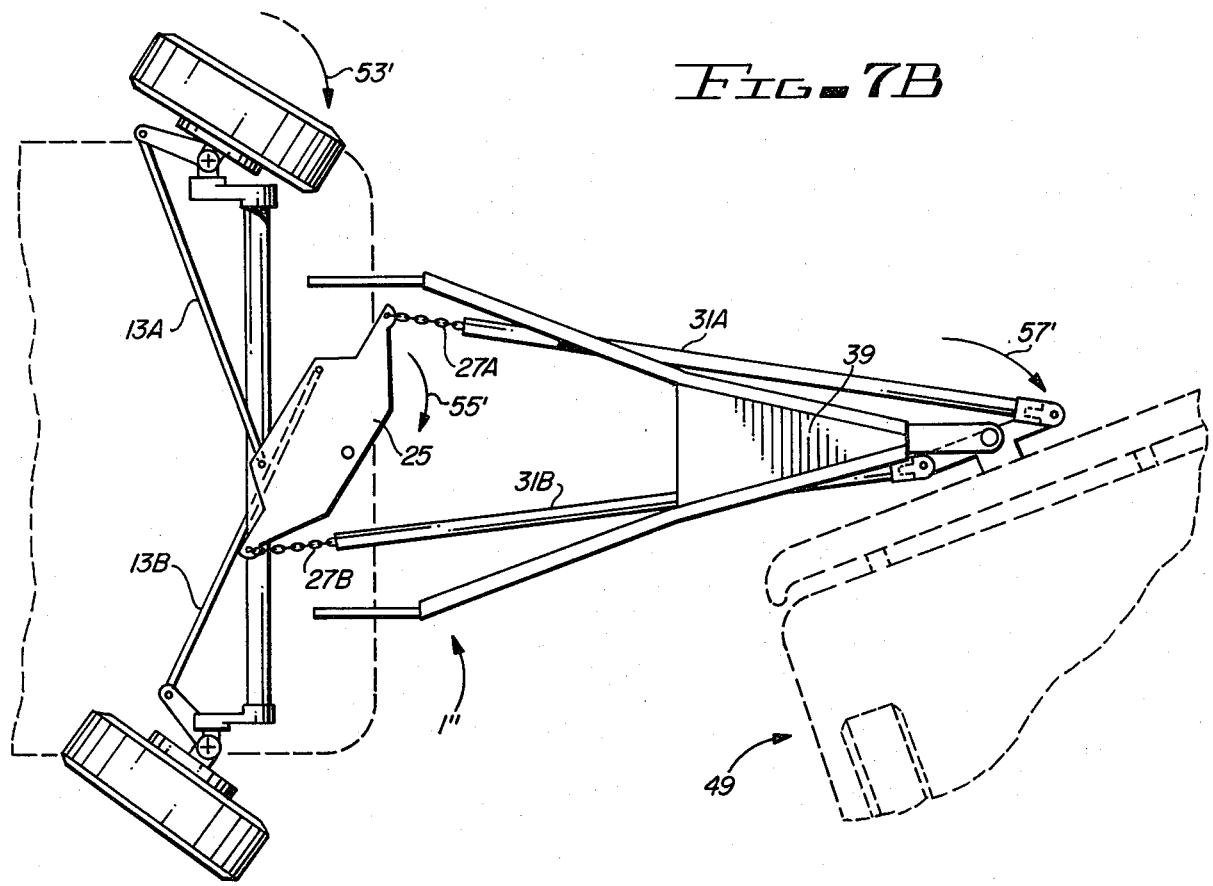
FIG. 7B is a partial schematic view of the embodiment of the invention shown in FIG. 7A wherein the tow vehicle is traversing a sharp curve.

As indicated by the schematic top view drawing in FIG. 7B, the operation of steering mechanism 1'' is entirely similar to the operation previously described insofar as draw bar 35, control arms 31A and 31B, chains 27A and 27B, primary steering arm 25' and tie rods 13A and 13B cooperate to effect the desired pivoting of front wheel spindles 7A and 7B and front wheels 9A and 9B to accomplish self-steering of trailer 1'.

The embodiment of the invention of FIG. 1A has been constructed and thoroughly tested and has been found to provide very high level of stability when towed by a small tow vehicle under a wide variety of test track conditions. A spread axle trailer having the disclosed steering mechanism has been found to be very easily backed up. The response and coordination of the driver backing up the trailer 1' are nearly identical to what his reactions would be when backing up an ordinary two wheeled single axle trailer, if its single axis were located near the rear end of the trailer. This is because tongue 39 can only move vertically relative to frame 3 because of the action of spaced pivots 43A and 43B. Thus, the frame 3, as viewed from above, remains aligned with tongue 39 in all instances. Front wheels 9A and 9B support the weight of the front end of the trailer. The steering of front wheels 9A and 9B is automatically accomplished so that minimal sideways scrubbing of the tires of wheels 9A and 9B with the driving surface is experienced as tow vehicle 49 and trailer 1' traverse very sharp turns in either the forward or reverse direction.

Referring now to FIGS. 2A–2C, the details of draw bar 35 are shown. More specifically, draw bar 35 includes a steel bottom plate 35C, a vertical plate 35D attached to the front edge of horizontal bottom plate 35C, and a horizontal top plate 35A having on edge connected to the top edge of vertical plate 35B. Plates 35A, 35B, and 35C can be composed of U-shaped steel channel material. A rectangular elongated slot 68 is formed in the upper mid-portion of vertical plate 35B to allow hitch ball support member 37 to pass through slot 68.

A pair of upright clamp members 59 and 63 are attached to the outer surface of vertical plate 35B. Clamping members 59 and 63 are positioned sufficiently close together to touch or nearly touch the edges of hitch support member 37 when it extends through slot 68.

A shallow U-shaped channel member 75 is attached to the inside surface of top plate 35A. The depth of channel formed by member 75 is sufficiently great to allow hitch support member 37 to extend through the channel. Circular holes 67, 77 and a hole, not shown, in bottom plate 35C are aligned to receive a bolt 73 attached to hitch ball 71. A cylindrical spacer 67 is snuggly disposed between the lower surface of channel number 35 and the upper surface of bottom plate 35C.

When draw bar 35 is attached to hitch support member 37, circular opening 37A is aligned with the above mentioned circular holes, including holes 69 and 77, after the end of hitch ball support member 37 is inserted through slots 68 and channel 75. Nut 75 then is threaded onto shaft 73 after it has been inserted through the above mentioned lined holes and also through spaces 67. This tightens the lower surface of top plate 35 and the inner surface of channel 75 against the upper and lower surfaces of hitch support member 37, thereby rigidly attaching draw bar 35 and hitch ball 71 to hitch support member 37. The upper and lower ends of clamping members 59 and 53 have holes 59A, 59B, and 63 respectively disposed therein for receiving bolts 61A and 61B. Bolts 61A and 61B are tightened to draw clamp members 59 and 63 tightly against the edge surface of hitch ball 37 to further increase the rigidity of the connection between draw bar 35 and hitch ball support member 37. Circular holes 65B and 65C in plate 35A and 35C, respectively. Universal joint coupler 83 has a hole 83A which is aligned with holes 65A and 65C, and bolt 81A extends through holes 65B, 83A, and 65C to pivotally connect coupler 83 to the right hand end of draw bar 35. An identical universal joint coupler, now shown in pivotally connected to the left hand end of draw bar 35. As previously explained, the universal joint coupler are pivotally connected to control arms 31A and 31B.

While the invention has been described with reference to several particular embodiments thereof, those skilled in the art will be able to make various modifications to the described embodiments without departing from the true spirit and scope of the invention. For example, other types of flexible members than chains 27A and 77B can be used as long as they result in substantially equal shortening of the tensile member connecting points 33A and 25A and the tensile member connecting points 33B and 25B when the effective tongue length is shortened due to shortening of the mechanical surge brake mechanism. Alternatively, limited travel telescoping members or the like could be used instead of the flexible members in some instances.

I claim:
1. A trailer comprising in combination:
   (a) a frame having a front portion and a rear portion;
   (b) tongue means pivotally connected to said front portion for effecting connecting of said trailer to a trailer hitching means attached to a tow vehicle;
   (c) first and second rear wheels and rear axle means for supporting said rear portion of said frame, said first and second rear wheels being rotatably connected to said rear axle means;
   (d) first and second front wheels and front axle means for supporting said front portion of said frame, said first and second front wheels being rotatably connected to said first axle means;
   (e) pivot connecting means for pivotably connecting said tongue means to said front portion and confining pivotal movement of said tongue means to a substantially vertical direction relative to a support surface supporting said trailer, said tow vehicle including a trailer guiding means rigidly connected to said tow vehicle and having first and second trailer connecting points spaced from and located on opposite sides of said trailer hitching means;
   (f) first and second spindle means for pivotally connecting said first and second wheels, respectively, to said front axle means to effect steering of said trailer;
   (g) first and second lever arms connected to said first and second spindle means, respectively, to effect controlled pivoting of said first and second spindle means;
   (h) primary steering arm means having first, second and third spaced points thereon pivotally connected at said first point to said frame for effecting pivoting of said spindle means in response to changing of direction of said tow vehicle relative to said trailer;
   (i) first coupling means for coupling said first and second lever arms to said primary steering arm means to effect pivoting of said first and second spindle means in response to pivoting of said primary steering arm means;
   (j) first tensile connecting means for connecting said second point of said primary steering arm means to said first trailer connecting point to pull said second point of said primary steering arm members toward said tow vehicle to cause pivoting of said primary steering arm means in response to turning of said tow vehicle in a first direction relative to said trailer;
   (k) second tensile connecting means for connecting said third point of said primary steering arm means to said second trailer connecting point to pull said third point toward said tow vehicle in response to turning of said tow vehicle in a second direction relative to said trailer, said first and second tensile connecting means exerting only substantial pulling forces on said primary steering arm means to cause pivoting of said primary steering arm means;
   (l) a plurality of wheel brake mechanisms for controllably applying braking forces to at least one of said front and rear wheels, said tongue means including mechanical surge braking means for connection to said trailer hitching means to actuate said wheel brake mechanisms in response to a rearward force exerted by said trailer hitching means on said tongue means, said first and second tensile connecting means allowing shortening of the effective length of said tongue means due to actuation of said mechanical surge braking means without exerting rearward forces on said second and third points of said primary steering arm means;
wherein said first tensile connecting means includes a first rigid member having first and second ends and first flexible means connected to the first end of said first rigid member and to said primary steering arm means for preventing said first tensile connecting means from producing a substantial pushing force on said primary steering arm means, and wherein said second tensile connecting means includes a second rigid member and second flexible means connected to a first end of said second rigid member for preventing said second tensile connecting means from producing a substantial pushing force on said primary steering arm means.

2. The trailer of claim 1 wherein said pivot connecting means includes first and second spaced pivot elements connected to said frame at an elevation that is substantially the same as the elevation at which said first and second tensile connecting means are connected to said primary steering arm means.

3. The trailer of claims 2 wherein said primary steering arm means includes a substantially horizontal plate member that pivots in a substantially horizontal plane.

4. The trailer of claim 1 wherein one end of said first flexible means is connected to said second point of said primary steering arm means and said second end of said first rigid member is connected to said first trailer hitching point.

5. The trailer of claim 4 wherein the length of said first flexible member is substantially less than the length of said first rigid member.

6. The trailer of claim 4 wherein said first flexible means includes a piece of chain having a plurality of links.

7. The trailer of claim 1 wherein said first coupling means includes first and second tie rods connected to the free ends of said first and second lever arms, respectively.

8. The trailer of claim 4 including pivotal coupling means for pivotally connecting said second end of said first rigid member to said trailer guiding means at said first point thereof.

9. The trailer of claim 1 wherein at least one of said first and second tension connecting means has some slack therein.

10. A steering mechanism for a spread axle trailer, the trailer including:
    i. a frame having a front portion and a rear portion, ii. a rear axle supporting the rear portion of the frame and first and second rear wheels rotatably connected to the rear axle, iii. a front axle supporting the front portion of the frame and first and second front wheels rotatably connected to the first axle, said steering mechanism comprising in combination:

(a) tongue means pivotally connected to said front portion for effecting connecting of said trailer to a trailer hitching means attached to a tow vehicle;

(b) pivot connecting means for pivotally connecting said tongue means to said front portion and confining pivotal movement of said tongue means to a substantially vertical direction relative to a support surface supporting said trailer;

(c) trailer guiding means for rigid connection to said tow vehicle and having first and second trailer connecting points spaced from and located on opposite sides of said trailer hitching means;

(d) first and second spindle means for pivotally connecting said first and second wheels respectively to said front axle means to effect steering of said trailer;

(e) first and second lever arms connected to said first and second spindle means, respectively, to effect controlled pivoting of said first and second spindle means;

(f) primary steering arm means having first and second and third spaced points pivotally connected at said first point to said frame for effecting pivoting of said spindle means in response to changing of direction of said towing vehicle relative to said trailer;

(g) first coupling means for coupling said first and second lever arms to said primary steering arm means to effect pivoting of said first and second spindle means in response to pivoting of said primary steering arm means;

(h) first tensile connecting means for connecting said second point of said primary arm means to said first trailer connecting means to pull said second point toward said tow vehicle to cause pivoting said primary steering arm means when said tow vehicle turns in a first direction relative to said trailer; and (i) second tensile means for connecting said third point of said primary steering means to said second trailer connecting means to pull said third point toward said tow vehicle when said tow vehicle turns in a second direction relative to said trailer, said first and second tensile connecting means exerting substantial forces only in tension on said primary steering arm means to cause pivoting of said primary steering arm means;

wherein said trailer guiding means includes (i) a U-shaped channel member having a horizontal upper plate member, a horizontal lower plate member and a vertical plate member connecting said upper and lower plate members, said trailer hitching means including an elongated hitch ball support member, having two opposed vertical side faces and upper and lower faces, rigidly attached to said tow vehicle, and a hitch ball having a threaded shaft extending therefrom for attachment of said hitch ball to said hitch ball support member, said hitch ball support member having a first hole in an end portion thereof, said vertical plate member having an opening for receiving said hitch ball support member, said upper plate member having a second hole for alignment with said first hole for receiving said threaded shaft and third and fourth holes located on opposite sides of said second hole for receiving first and second bolts, said lower plate member having a fifth hole aligned with said third hole for receiving said first bolt, a sixth hole aligned with said second hole for receiving said threaded shaft, and a seventh hole aligned with said fourth hole for receiving said second bolt;

(ii) first clamping means rigidly attached to said U-shaped channel member for clamping against said opposed vertical side faces of said hitch ball support member when said hitch ball support member extends through said opening in said vertical plate members, to prevent movement of said U-shaped channel member relative to said hitch ball support member; and (iii) second clamping means rigidly attached to said upper plate member for rigidly clamping said upper plate member to said hitch ball support member.

11. The steering mechanism of claim 10 wherein said first clamping means includes first and second vertical members attached, respectively, to the outer surface of said vertical plate member on either side of said opening in said vertical plate member, said first and second vertical members each having an upper hole and a lower hole, said first clamping means further including a bolt extending through said upper holes and a bolt extending through said lower holes for drawing first and second vertical members tightly against said opposed vertical side surfaces of said hitch support member.

12. A spread axle trailer having two rear wheels and first and second front wheels mounted on steering spindles, said trailer comprising in combination:

a frame;

a tongue pivotally connected to the front of said frame to effect pivoting of said tongue, said pivoting being confined to a vertical direction, a tow vehicle for towing said trailer including first and second connecting points located on opposite sides of a trailer hitch connected to the tow vehicle;

a primary steering member having first, second and third spaced points, said primary steering member being pivotally connected at said first point to said frame;

first coupling means for coupling said steering spindles to said primary steering member to effect steering of said first and second steering spindles in response to pivoting of said primary steering member;

first tensile connecting means for connecting said second point to said first connecting point to pull said second point toward said tow vehicle to cause pivoting of said primary steering member in response to turning of said tow vehicle in a first direction; and second tensile connecting means for connecting said third point to said second connecting point to pull said third point toward said tow vehicle when said tow vehicle turns in a second direction, said first and second tensile connecting means exerting only substantial pulling forces on said second and third points;

wherein said first tensile connecting means includes a first rigid member having first and second ends and first flexible means connected to the first end of said first rigid member and to said primary steering arm means for preventing said first tensile connecting means from producing a substantial pushing force on said primary steering arm means, and wherein said second tensile connecting means includes a second rigid member and second flexible means connected to a first end of said second rigid member for preventing said second tensile connecting means from producing a substantial pushing force on said primary steering arm means.

13. A method of operating a spread axle trailer connected to a tow vehicle having a trailer hitch and first and second fixed, spaced connecting points, the trailer having a frame, two rear wheels, and first and second front wheels mounted on steering spindles, the trailer having a tongue pivotally connected to effect pivoting of the tongue confined to a vertical direction relative to a frame of the trailer; said method comprising the steps of:
  turning the tow vehicle in a first direction, the trailer having a primary steering member pivotally connected to the frame;
  pulling a first point of the primary steering member toward the first connecting point in response to said turning to cause turning of the primary steering member in a clockwise direction by means of a first tensile member connected between the first connecting point and the first point of the primary steering member;
  translating said turning of said primary steering member to said steering spindles to effect steering of the front wheels of the trailer to track with said turning of said tow vehicle without substantial sideways scrubbing of said front wheels of said trailer on a roadway surface;
  turning the tow vehicle in a second direction opposite to said first direction;
  pulling a second point of the primary steering member toward said second connecting point in response to said turning in said opposite direction to cause turning of the primary steering member in a counterclockwise direction by means of a second tensile member connected between the second connecting point and the second point of the primary steering member;
  translating said counterclockwise turning of said primary steering member to said steering spindles to effect steering of said front wheels to cause said trailer to track with said turning of said tow vehicle in said second direction without substantial sideway scrubbing of said front wheels on the roadway surface; and
  shortening the effective length of said tongue in response to shortening of a mechanical surge brake device before or during said turning in said first direction or said turning in said second direction, said first and second tensile members each also shortening by an amount substantially equal to the amount of shortening of the effective length of said tongue so that the trailer accurately tracks with the two vehicle when the brakes of the tow vehicle are applied or when the two vehicles are backing up, and maintaining substantial tensile forces in both said first and second tensile members during all of said turning in said first and second directions and during the entire time that the brake of the tow vehicle are applied and during the entire time the two vehicles are backing up.

14. A trailer comprising in combination:
(a) a frame having a front portion and a rear portion;
(b) tongue means pivotally connected to said front portion for effecting connecting of said trailer to a trailer hitching means attached to a tow vehicle;
(c) first and second rear wheels and rear axle means for supporting said rear portion of said frame, said first and second rear wheels being rotatably connected to said rear axle means;
(d) first and second front wheels and front axle means for supporting said front portion of said frame, said first and second front wheels being rotatably connected to said first axle means;
(e) pivot connecting means for pivotably connecting said tongue means to said front portion and confining pivotal movement of said tongue means to a substantially vertical direction relative to a support surface supporting said trailer, said tow vehicle including a trailer guiding means rigidly connected to said tow vehicle and having first and second trailer connecting points spaced from and located on opposite sides of said trailer hitching means,
(f) first and second spindle means for pivotally connecting said first and second wheels, respectively, to said front axle means to effect steering of said trailer;
(g) first and second lever arms connected to said first and second spindle means, respectively, to effect controlled pivoting of said first and second spindle means;
(h) primary steering arm means having first, second and third spaced points thereon pivotally connected at said first point to said frame for effecting pivoting of said spindle means in response to changing of direction of said tow vehicle relative to said trailer;
(i) first coupling means for coupling said first and second lever arms to said primary steering arm means to effect pivoting of said first and second spindle means in response to pivoting of said primary steering arm means;
(j) first tensile connecting means for connecting said second point of said primary steering arm means to said first trailer connecting point to pull said second point of said primary steering arm members toward said tow vehicle to cause pivoting of said primary steering arm means in response to turning of said tow vehicle in a first direction relative to said trailer;
(k) second tensile connecting means for connecting said third point of said primary steering arm means to said second trailer connecting point to pull said third point toward said tow vehicle in response to turning of said tow vehicle in a second direction relative to said trailer, said first and second tensile connecting means exerting only substantial pulling forces on said primary steering arm means to cause pivoting of said primary steering arm means; and
(l) a plurality of wheel brake mechanisms for controllably applying braking forces to at least one of said front and rear wheels, said tongue means including mechanical surge braking means for connection to said trailer hitching means to actuate said wheel brake mechanisms in response to a rearward force exerted by said trailer hitching means on said tongue means, said first and second tensile connecting means allowing shortening of the effective length of said tongue means due to actuation of said mechanical surge braking means without exerting rearward forces on said second and third points of said primary steering arm means;

wherein said pivot connecting means includes first and second spaced pivot elements connected to said frame at an elevation that is substantially the same as the elevation at which said first and second tensile connecting means are connected to said primary steering arm means, wherein said primary steering arm means includes a substantially horizontal plate member that pivots in a substantially horizontal plane, wherein said horizontal plate member includes said second and third points and also includes a fourth point, and wherein said first coupling means includes secondary steering arm means pivotally connected to said frame for rotating in response to rotation of said longitudinal plate member, connecting means connected between said fourth point of said longitudinal plate member and a first point of said secondary steering arm means for effecting translating of rotation of said horizontal plate member to said secondary steering arm means, and first tie rod means connected between a second point of said secondary steering arm means and a free end of said first lever arm.

* * * * *